US009560692B2

(12) United States Patent
McGee et al.

(10) Patent No.: US 9,560,692 B2
(45) Date of Patent: Jan. 31, 2017

(54) CONTROLLING A MACHINE IN REMOTE OR AUTONOMOUS MODE

(71) Applicant: CATERPILLAR INC., Peoria, IL (US)

(72) Inventors: Robert Jason McGee, Peoria, IL (US); Jean-Jacques Clar, Edelstein, IL (US); Craig L. Koehrsen, East Peoria, IL (US); Brian Gerard Funke, Peoria, IL (US); Brett Andrew Eisenmenger, Queensland (AU); Deepa Jeyamani, Peoria, IL (US); Kent James Chesko, Peoria, IL (US); Clarence Matthew Glover, Edwards, IL (US); Shahul Hameed Mohammed, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 392 days.

(21) Appl. No.: 14/153,614

(22) Filed: Jan. 13, 2014

(65) Prior Publication Data

US 2015/0198936 A1 Jul. 16, 2015

(51) Int. Cl.
*G05B 13/02* (2006.01)
*H04W 88/00* (2009.01)
*E02F 9/20* (2006.01)
*G05D 1/00* (2006.01)

(52) U.S. Cl.
CPC ............. *H04W 88/00* (2013.01); *E02F 9/20* (2013.01); *G05D 1/0038* (2013.01); *G05D 1/0061* (2013.01); *G05D 2201/0202* (2013.01)

(58) Field of Classification Search
CPC .................................................... H04W 88/00
USPC ........................................................ 700/40
See application file for complete search history.

(56) References Cited

U.S. PATENT DOCUMENTS

| 5,448,479 A * | 9/1995 | Kemner | B62D 1/28 180/167 |
| 6,259,980 B1 * | 7/2001 | Peck | B60T 7/12 701/24 |
| 6,633,800 B1 * | 10/2003 | Ward | B60W 50/02 180/167 |

(Continued)

FOREIGN PATENT DOCUMENTS

CA 2333781 7/2002

OTHER PUBLICATIONS

Fong, Terrence, and Charles Thorpe. "Vehicle teleoperation interfaces." Autonomous robots 11.1 (2001): pp. 9-18.*

(Continued)

*Primary Examiner* — Satish Rampuria
(74) *Attorney, Agent, or Firm* — Finnegan, Henderson, Farabow, Garrett & Dunner, LLP (57) ABSTRACT

A system for controlling a machine may include a remote control (RC) input device configured to remotely initiate a RC enabled mode on the machine. The RC input device may subsequently establish a communication link with the machine when no other RC input device currently has a communication link with the machine. The RC input device may transition the machine to a RC reserved mode in which the machine is reserved for control by the RC input device, and transition a mode of control for the machine to a RC active mode from the RC reserved mode. The RC input device may selectively control the machine when in the RC active mode. The RC input device may also transition the mode of control for the machine to an autonomous mode from the RC active mode.

15 Claims, 5 Drawing Sheets

(56) References Cited

U.S. PATENT DOCUMENTS

| | | | | |
|---|---|---|---|---|
| 2010/0250023 A1* | 9/2010 | Gudat | ............... | E02F 9/2045 |
| | | | | 701/2 |
| 2012/0234930 A1* | 9/2012 | Wijaya | ............... | G08C 17/00 |
| | | | | 236/51 |

OTHER PUBLICATIONS

Fong, Terrence, Charles Thorpe, and Charles Baur. "Multi-robot remote driving with collaborative control." Industrial Electronics, IEEE Transactions on 50.4 (2003): pp. 699-704.*

Shladover, Steven E., et al. "Automated vehicle control developments in the PATH program." Vehicular Technology, IEEE Transactions on 40.1 (1991): 114-130.*

* cited by examiner

CONTROLLING A MACHINE IN REMOTE OR AUTONOMOUS MODE

TECHNICAL FIELD

The present disclosure relates generally to controlling a machine, and more particularly to controlling a machine in remote or autonomous mode.

BACKGROUND

Mining and large scale excavating operations may require fleets of machines to transport excavated material (e.g., dirt, rocks, gravel, etc.) from an area of excavation to a secondary location. For such an operation to be productive and profitable, the fleet of machines must be efficiently operated. One way to efficiently operate a fleet of machines is to reduce the number of operators required to operate the fleet by, for example, operating machines in a remote mode and/or an autonomous mode.

A system for operating a machine in an autonomous mode is disclosed in U.S. Pat. No. 5,448,479 (the '479 patent), issued to Kemner et al. The '479 patent discloses a system and method for remotely controlling an autonomous mobile vehicle using a tele-panel to interrupt autonomous operation. In tele-operation, an operator controls the vehicle using a tele-panel (remote control). The transition periods between autonomous, manual, and tele-operation (remote control) are strictly controlled for safety reasons. When the vehicle receives commands from the tele-panel, the vehicle ceases autonomous operation and enters a tele-ready mode. Once in a tele-ready mode, the vehicle will not respond to commands from other tele-panels and cannot resume autonomous operations.

Although the '479 patent may increase the flexibility of available operational modes for a fleet of machines by enabling manual, autonomous, and remote control modes, the '479 patent may still be less than optimal. In particular, the remote mode (tele-operation mode) disclosed in the '479 patent can only be entered from the autonomous mode. As a result, the system and method of the '479 patent may require a fleet manager and other controls used to operate multiple machines in autonomous mode even if certain applications only call for the ability to remotely control a single machine.

The system and method of the present disclosure solves one or more problems set forth above and/or other problems in the art.

SUMMARY

In one aspect, the present disclosure is directed to a system for controlling a machine. The system may include a remote control (RC) input device configured to remotely initiate a RC enabled mode on the machine. The RC input device may also be configured to subsequently establish a communication link with the machine when no other RC input device currently has a communication link with the machine. The RC input device may be further configured to transition the machine to a RC reserved mode in which the machine is reserved for control by the RC input device. The RC input device may be still further configured to transition a mode of operation of the machine to a RC active mode from the RC reserved mode, the RC input device selectively controlling the machine when in the RC active mode. The system may further include the RC input device being configured to transition the mode of operation of the machine to an autonomous mode from the RC active mode.

In another aspect, the present disclosure is directed to a method for controlling a machine. The method may include transitioning a mode of control for the machine to a RC enabled mode from a manual mode. The method may further include establishing a communication link between a first RC input device and the machine, and subsequently changing the mode of control for the machine from the RC enabled mode to a RC reserved mode in which other RC input devices are no longer permitted to establish a communication link with the machine. The method may still further include transitioning the mode of control for the machine from the RC reserved mode to a RC active mode in which the machine is being controlled by signals received from the first RC input device. From the RC active mode the machine may then be transitioned to an autonomous active mode in which the machine is being controlled by signals including signals indicative of an overall mission plan for the machine received from a central site command server.

In another aspect, the present disclosure is directed to a machine configured to operate under a plurality of modes of control. The machine may include a controller configured to place the machine in a selected mode of control based on an input received from a RC input device, the selected mode of control being one of a manual mode, a RC enabled mode, a RC reserved mode, a RC active mode, and an autonomous active mode. The machine may further include the controller being further configured to only transition the machine to the autonomous active mode from the RC active mode.

DETAILED DESCRIPTION

Figure 1:
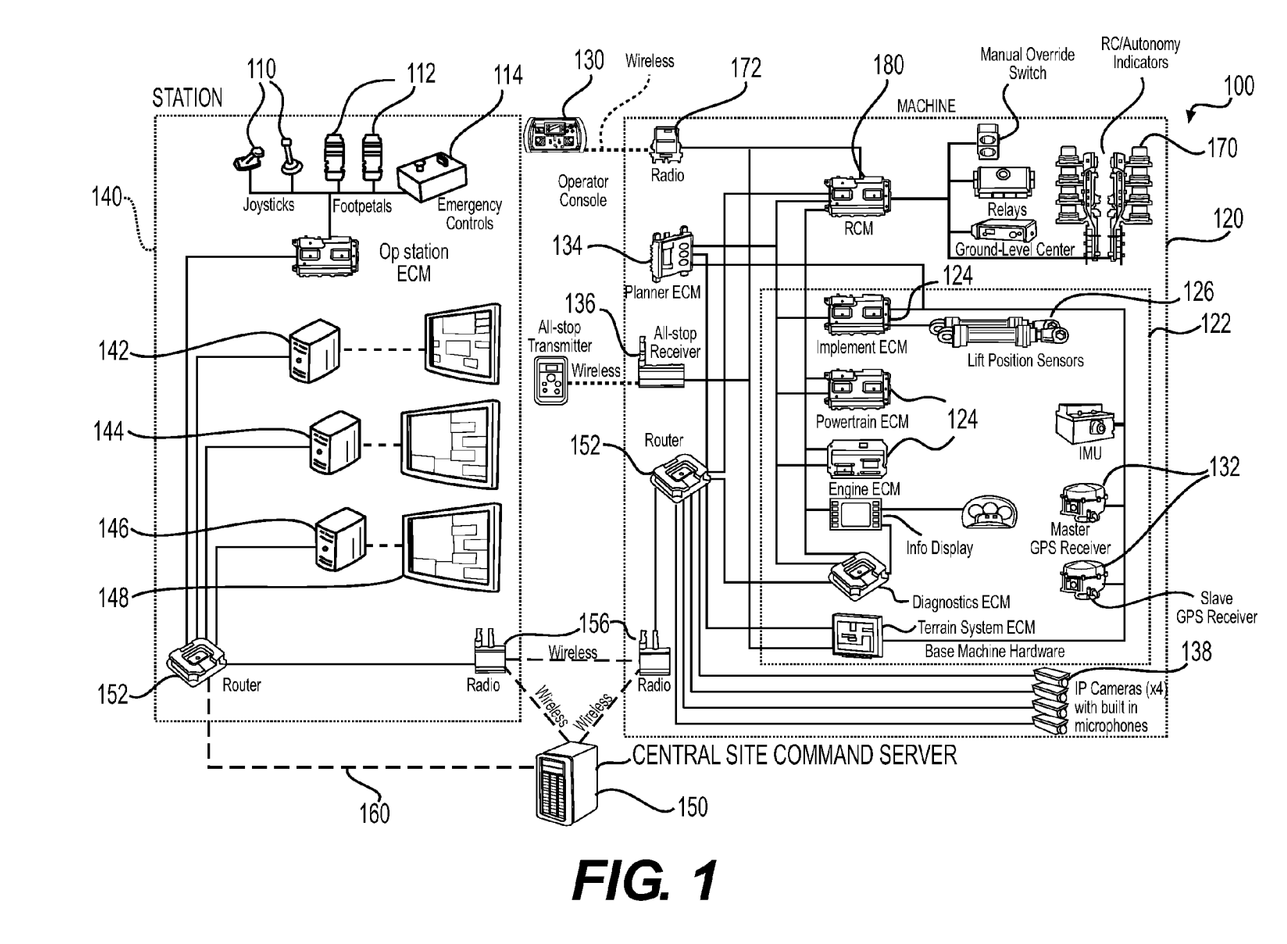
FIG. 1 is a diagrammatic illustration of exemplary hardware architecture for the disclosed system.

FIG. 1 illustrates exemplary hardware for a remote control and/or autonomous system 100. System 100 may include a mobile machine 120, a remote control (RC) operator console 130, a remote control (RC) operator station 140, and a central site command server 150. Mobile machine 120 may be provided with a basic set of hardware 122, including various electronic control modules (ECMs) 124 for controlling machine subsystems and aspects of the operation of mobile machine 120. Various controllers, sensors and actuators may be connected together in system 100 over one or more communication networks. Although illustrated as being implemented with various distinct units of hardware, one of ordinary skill in the art will recognize that the same functionality may be achieved through hardware, firmware, software, or combinations thereof. An implement ECM may receive input from sensors associated with operation of an implement, such as lift position sensors 126. The implement ECM may control operation of one or more implements. A powertrain ECM and an engine ECM may control machine output such as speed, acceleration, gear ratio, engine RPM, direction of movement, output power, and output torque. Additional hardware provided with mobile machine 120 may include master and slave global positioning system (GPS) receivers 132, and one or more inertial measurement units (IMU) for providing signals indicative of the geographical position and orientation of the machine.

Additional optional hardware, and/or hardware and software combinations may be added to mobile machine 120 depending on what modes of operation may be desired for controlling mobile machine 120. The selection of optional hardware or control features may depend on whether control commands could be provided to mobile machine 120 from one or more of central site command server 150, RC operator station 140, and/or RC operator console 130. This additional hardware may include a planner ECM 134 configured to implement various autonomous operational commands. Planner ECM 134 may determine and specify how mobile machine 120 will carry out tasks assigned to it by a mission plan received from central site command server 150. The mission plan received from central site command server 150 may assign tasks to multiple mobile machines operating at a work site, and track their progress as they perform these tasks. Planner ECM 134 on-board mobile machine 120 may determine and implement instructions at a more granular level, such as specifying the path that a particular machine will take to complete an assigned task. Planner ECM 134 may send specific control signals to the various subsystem ECMs such as the powertrain ECM and the engine ECM. The subsystem ECMs on a mobile machine 120 may generate control signals indicative of speed, steering angle, engine rpm, output torque, movement of implements, and other control instructions for operating mobile machine 120 in an autonomous active mode. An all-stop receiver 136 may also be provided to stop autonomous or remote operation of mobile machine 120. Conditions under which an automatic stop of mobile machine 120 may be desired may include a break in a communication link established with a remote control module (RCM) 180 on-board mobile machine 120. A wireless communication link may be established between line-of-sight (LOS) radio 172 on mobile machine 120 and either RC operator console 130 or RC operator station 140. Wired ethernet communication links may also be established between RC operator station 140 and central site command server 150 through ethernet lines 160, ethernet routers 152, ethernet radios 156, and optional ethernet switches (not shown). Wireless communication links may also be established between any of central site command server 150, RC operator station 140, and/or RC operator console 130. Other conditions under which an automatic stop of mobile machine 120 may be desired may include the receipt by RCM 180 of warnings such as an avoidance warning when approaching too close to another machine or obstacle, or a tilt warning when the machine exceeds a safe tilt level. Additional hardware provided on-board mobile machine 120 may include manual override controls, relays, and RC and autonomy indicators 170. Cameras 138 and microphones may also be included with system 100 to provide video and audio data of the immediate area around mobile machine 120, and of the entire work site.

RC operator station 140 may be configured to provide a comfortable environment from which an operator may control a specific machine operating at a particular work site. RC operator station 140 may include an operator seat, monitors, footpedals, and other controls similar to the features found in a cab on mobile machine 120. As shown in FIG. 1, some of these controls may include various input devices such as joysticks 110, foot pedals 112, and emergency controls 114. Other features of RC operator station 140 may include a user interface module 142, video decoder module 144, and central site command and terrain client module 146. Some of these features of RC operator station 140 may also be provided in a more simplified and portable implementation on RC operator console 130. The input features on both RC operator station 140 and RC operator console 130 enable initiation of and transition between remote control and autonomous modes of operation for mobile machine 120. In a non-line-of-sight (NLOS) version of RC operator station 140, a display screen 148 may be included to provide audio and video of the mobile machine being controlled. A line-of-sight (LOS) version of RC operator station 140 may be positioned such that an operator can actually see the machine being controlled from the operator station. Communication links may be provided between RC operator station 140, RC operator console 130, central site command server 150, and mobile machine 120. These communication links may include wireless communication paths, wired ethernet connections, or combinations of wireless and wired communication paths, including ethernet lines 160, routers 152, switches 154, and radios 156.

Figure 4:
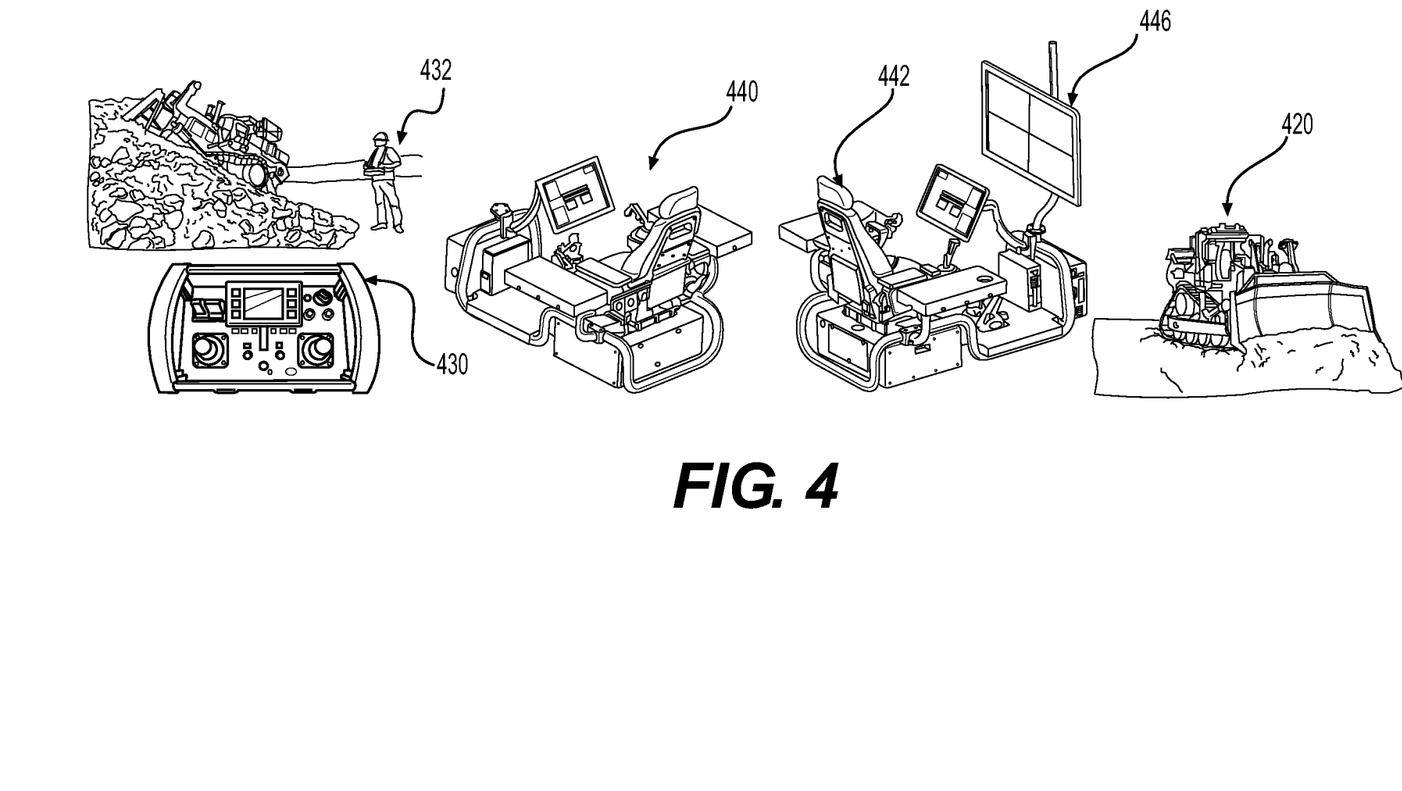
FIG. 4 illustrates exemplary equipment that may include the hardware architecture of FIG. 1.

Referring to FIG. 4, some examples of equipment that may be included with remote control and autonomous system 100 are illustrated. A bulldozer 420 is just one possible example of the types of mobile machines that system 100 may include. Other types of mobile machines may include earth moving machinery such as a scraper, or other machinery configured to perform the types of operations associated with an industry such as mining, construction, farming, and transportation. In certain harsh or dangerous environments it may be desirable to be able to operate mobile machine 120 from outside of the cab of the machine and at a safe distance from the work area. RC input devices make this possible. An exemplary, portable RC operator console 430 may provide such an input device, and may be sufficiently portable to either be handheld or worn over-the-shoulder by an operator 432 while the operator is standing in view of the mobile machine being remotely controlled, but at a safe distance from the machine. An additional input device may include a RC operator station 440, where RC operator station 440 is an example of a line-of-sight (LOS) operator station. In an alternative implementation, an exemplary RC operator station 442 may be provided as a non-line-of-sight (NLOS) operator station. Both LOS operator station 440 and NLOS operator station 442 may be configured to essentially duplicate features typically found inside of a cab on mobile machine 120. However, RC operator stations may be located at a distance from the actual job site to provide a safe and comfortable environment for an operator. In addition to the control features provided with LOS operator station 440, NLOS operator station 442 may include one or more monitors and speakers 446 to provide video and audio signals received from the work site. Referring back to FIG. 1, some of the equipment provided on mobile machine 120 may vary depending on which of the types of equipment shown in FIG. 4 are to be included with remote control and autonomous system 100. As one example, a network support kit with audio and video inputs may be added to mobile machine 120 when a NLOS RC operator station will be included as part of system 100. In another example, planner ECM 134 may not be included with system 100 if a user only desires the ability to remotely control mobile machine 120, without an autonomous mode of control. System 100 may be scalable such that a user only desiring to operate mobile machine 120 using a RC operator console 130 may purchase system 100 without the extra control hardware on the mobile machine needed for NLOS modes of control, and without central site command server 150 or other controls needed for an autonomous mode of control. However, if a need for autonomous control arises, system 100 can be easily upgraded to include the additional hardware.

Figure 2:
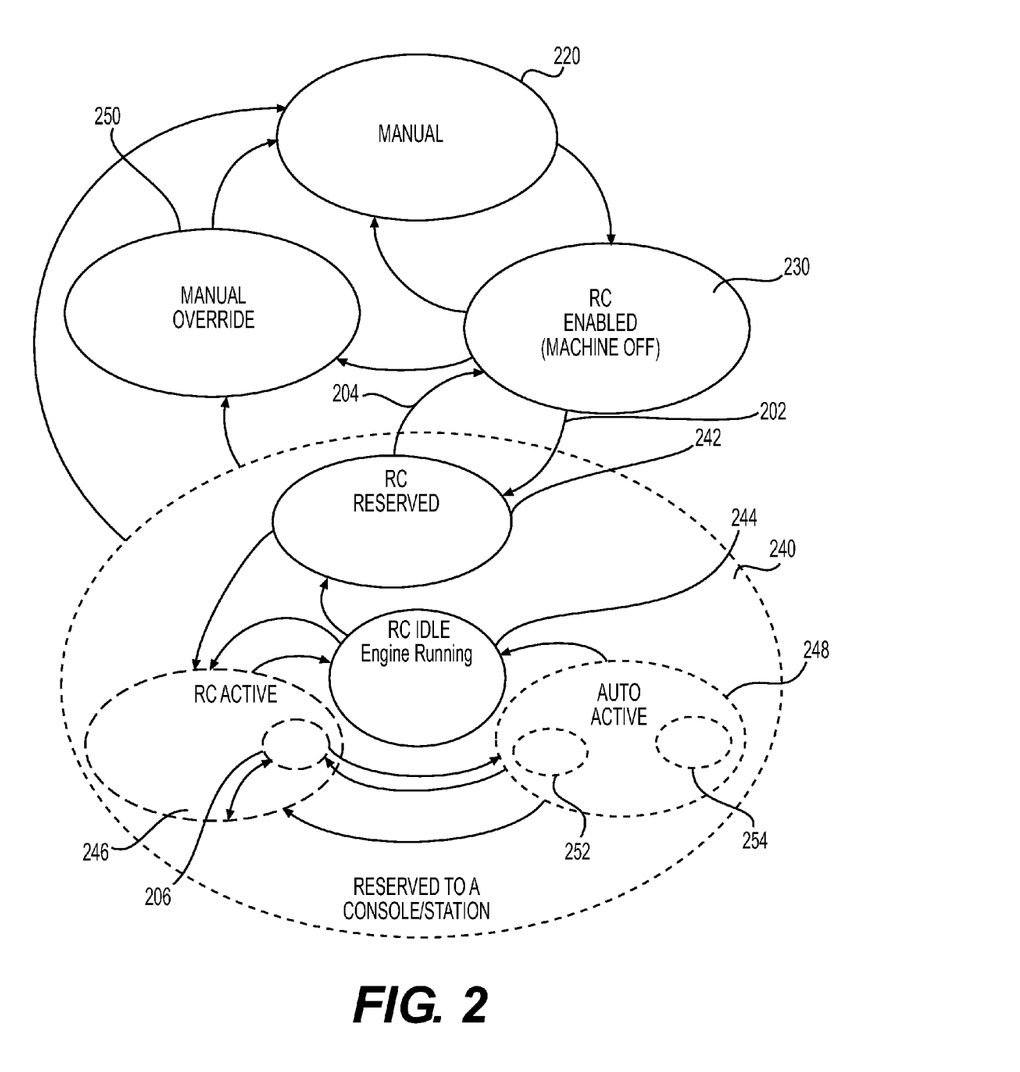
FIG. 2 is an operational mode change diagram that may be implemented by the hardware architecture of FIG. 1.
Figure 3:
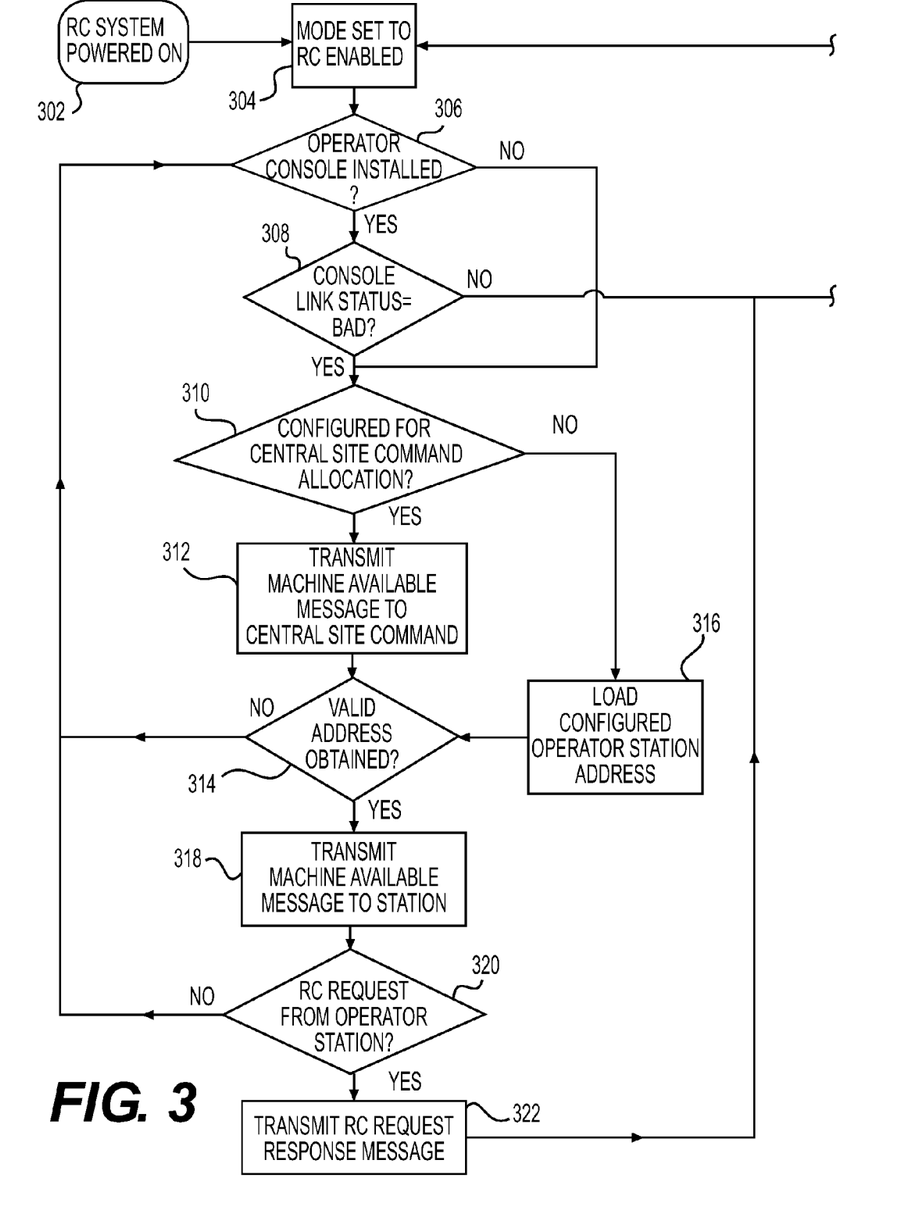
FIG. 3 is an exemplary method for transitioning between modes of operation shown in FIG. 2.

The various modes of control of mobile machine 120 that may be supported by the exemplary hardware and equipment of FIGS. 1 and 4, as well as the sequence of steps that may be taken to transition between the modes are shown in FIGS. 2 and 3. FIGS. 2 and 3 will be described in detail in the following section.

INDUSTRIAL APPLICABILITY

The system and method according to various implementations of this disclosure provide the flexibility to control a mobile machine in various modes of control such as manual control, remote control, and autonomous control. The system is also scalable in that it allows for the selection of only the specific control features that are needed for a certain application. In applications where features associated with remote control of the vehicle from a NLOS RC operator station are not needed, these features can be left out of the system without affecting the ability to use a RC operator console for control of the machine. Similarly, if remote control is desired, but autonomous control is not necessary, control features associated with a central site command server, planner ECM, and any other hardware or software required for autonomous control may be eliminated. One exemplary implementation of the system may only have the capability to operate the mobile machine manually or in remote control using a RC user console 130. A more inclusive implementation of the system may be capable of operating in any of manual mode, remote control mode for both line-of-sight and non-line-of-sight applications, and autonomous mode. Sequences of steps may be taken in accordance with disclosed exemplary methods to allocate a particular RC input device that will be allowed to control the mobile machine at a particular time. Specific procedures may also be followed to ensure the safe transition from one mode of control to another, and from control by one input device to another.

Referring to FIG. 2, an exemplary mode change diagram illustrates various modes of control of a mobile machine, how each mode is initiated, and how transitions between the modes are implemented. An operator on-board a mobile machine may initiate a manual mode of control 220 by activating a switch or other input device. Transition to manual mode 220 may also be implemented from a RC input device such as RC operator console 130, or RC operator station 140. A manual override mode 250 may be initiated to transition the mode of control back to manual mode from other modes of control. An operator may relinquish the manual mode of control of the mobile machine by putting the machine into RC enabled mode 230. The transition between manual mode 220 and RC enabled mode 230 may be implemented by flipping a RC/manual switch on-board the mobile machine. Alternatively or in addition, the transition may be implemented remotely using controls on either RC operator console 130 or RC operator station 140. The mode of control of the mobile machine may be transitioned back to manual mode from RC enabled mode 230, or from any of RC input device initiated modes 240 by activation of manual override mode 250. Manual override mode 250 may be activated through a manual override switch.

As shown by the flow of the arrows in FIG. 2, a machine must be placed into RC enabled mode 230 before the machine can be reserved for remote control by any RC input device. Exemplary RC input device initiated modes 240 are illustrated in FIG. 2 within a large bubble. RC input device initiated modes 240 can only be implemented at a mobile machine once a communication link has been established between the mobile machine and the RC input device. The modes of control that may be initiated by a RC input device include RC reserved mode 242, RC active mode 246, RC idle mode 244, autonomous enabled mode 206, and autonomous active mode 248. Initiation of a mode of control using a RC input device may be achieved manually, such as by pressing a button on the RC input device, assuming that certain preconditions have been met. For example, as illustrated by the arrows in FIG. 2, a RC input device such as RC operator console 130 or RC operator station 140 must first be successfully reserved to a mobile machine before an operator at the RC input device may initiate RC active mode 246. Once RC active mode 246 has been initiated, the RC input device can send control commands to the RCM 180 on-board mobile machine 120 and to the various subsystems of mobile machine 120 that perform a desired task. One of ordinary skill in the art will recognize that the functions performed by RCM 180 could alternatively be performed by one or more controllers or control modules that may be separate from or incorporated into one or more of electronic control modules (ECMs) on-board mobile machine 120 for controlling the various subsystems of the machine. When in RC active mode, certain conditions or attempted control actions taken by an operator may result in an override signal, which may be displayed at the RC input device. Conditions that may result in an override signal when in RC active mode may differ from conditions that may result in an override signal when in a different mode such as autonomous active mode 248. Additionally, an operator may receive avoidance warnings while operating in RC active mode, thereby enabling the operator to take the necessary actions to avoid a collision. Certain conditions, such as a break in the communication link to the machine, or attempted operations that are not allowed for safety or other reasons may transition the mode of operation from RC active mode into RC idle mode 244.

An operator who has successfully transitioned the mobile machine to RC active mode 246 from RC reserved mode 242 may decide to initiate autonomous enabled mode 206. From autonomous enabled mode 206, the operator may cause the machine to transition out of RC active mode by initiating autonomous active mode 248. The autonomous active mode 248 may be toggled on and off from autonomous enabled mode 206, as shown by the arrows in FIG. 2. Once a machine is in autonomous active mode 248, an operator may attempt to control certain operations of the machine while in autonomous active mode, but without transitioning the machine out of autonomous active mode. For example, an operator of a RC operator station may attempt to affect the steering of a bulldozer under autonomous control by directing the blade of the bulldozer to cut into the ground more on one side than the other. These types of remote control commands may only be allowed while in autonomous active mode 248 if they are determined to be overridable commands. When the machine receives overridable commands from an RC input device while in autonomous active mode 248, the machine may enter a RC override mode for a short period of time (e.g., 30 seconds). An RC override mode 252 (illustrated in FIG. 2 by a dashed bubble inside of the dashed bubble for autonomous active mode 248) may allow an operator to command the machine for short periods of time without transitioning the machine out of autonomous active mode. An operator may continue to send overridable commands that result in the autonomous active mode changing to the RC override mode for repeated short periods of time. An autonomous pause mode 254 (illustrated by another dashed bubble inside of the dashed bubble for autonomous active mode 248) may also be entered automatically at times when the machine is waiting on something like mission plan updates. If an operator attempts a non-overridable command, such as a command that could damage the machine or place it into an unsafe situation, or a command that cannot be performed while the machine is being operated in autonomous mode, the autonomous active mode may be toggled off, returning the machine to RC active mode. Once back in RC active mode there may be a different set of conditions or operations that are allowed and that would not be allowed in autonomous active mode. Other conditions occurring while the machine is in autonomous active mode may also cause the machine to transition out of autonomous active mode directly into RC idle mode 244. Examples of these types of conditions may include the loss of a communication link between central site command server 150 and the machine.

RC idle mode 244 is a mode that is put in place to help protect the machine's engine and make recovery from loss of communication links less cumbersome. When in RC active mode 246 or autonomous active mode 248, a loss of a communication link may cause the system to transition into RC idle mode 244. Upon entering this mode, RC modes or autonomous modes may be deactivated. If the engine on the mobile machine was already running, it may be transitioned to a low idle speed. Additional operations that may be implemented in RC idle mode may include ramping service brakes to a fully engaged position, engaging the parking brake, and engaging lockout of the machine implements. Once in RC idle mode 244, the engine speed may be checked to see if the engine is running. The engine may be considered to be running if the engine speed is greater than a threshold, such as 200 RPM. If the engine is not running, and the reason that RC idle mode 244 was entered was a loss of communication link, RC reserved mode 242 may be entered. Otherwise, a timer may begin counting down. If the timer expires before the communication link is reestablished, RC reserved mode may be entered, and the machine may be powered down. An immediate transition from RC idle mode to RC reserved mode may also occur if a command stop is activated, or if other conditions such as an unacceptable machine tilt are detected. From RC reserved mode 242, RC active mode 246 may be entered again, or if the communication link between the machine and the RC input device is disconnected, the machine may return to RC enabled mode 230.

Remote control of mobile machine 120 can only be allocated to one RC input device at a time. Allocation of a RC input device may refer to an IP address or other identifying information associated with the RC input device that is configured to be authorized to control a specific machine. RCM 180 on-board mobile machine 120 can only be allocated to one RC input device at a time. In various implementations of system 100, central site command server 150 may allocate RCM 180 on-board a machine to a particular RC input device. In these implementations, RCM 180 may send a "Machine Available" signal to central site command server 150, and then wait for central site command server 150 to provide the IP address and/or other identifying information necessary to establish communication with a particular RC input device. In alternative implementations where RCM 180 is not configured to be allocated by central site command server 150, RCM 180 may be configured to receive an IP address and/or other identifying information directly from a RC input device that has been previously configured to control the machine including RCM 180. A RC input device needs connectivity, but does not need to be "linked" to the mobile machine in order to change allocation. The configuration message sent to a mobile machine to allocate a particular RC input device to that machine may also come from a different RC input device. Changing the IP address and/or other identifying information needed to make a communication connection with a particular RC input device is called allocating, or reallocating the machine.

A mobile machine can only be allocated (or reallocated) to a particular RC input device when the machine is in RC enabled mode 230. Once a RC communication link has been established between the mobile machine and the RC input device (RC link to machine connected 202 in FIG. 2), the mobile machine is said to have been reserved to the RC input device. At this point, the machine can no longer be reserved by another RC input device until the RC link with the machine has been disconnected (RC link to machine disconnected 204 in FIG. 2), thereby putting the machine back into its RC enabled mode 230. If an attempt is made to allocate a machine to a RC input device when the machine is not in its RC enabled mode, the change will not take.

RC arbitration refers to resolving which RC input device (a RC operator console or RC operator station) has (or will have) control of the machine. RC arbitration takes place within RCM 180 on-board mobile machine 120. As discussed above, one of ordinary skill in the art will recognize that the functions performed by RCM 180 could alternatively be performed by one or more controllers or control modules that may be separate from or incorporated into one or more of electronic control modules (ECMs) on-board mobile machine 120 for controlling the various subsystems of the machine. Once a RC input device has been arbitrated to control the machine, no other RC input device can reserve the machine until the current RC input device controlling the machine has disconnected its communication link with RCM 180, thereby relinquishing control of the machine.

Arbitration occurs on a first-come, first-serve basis, where the first method of control (RC operator console or RC operator station) to establish a link to the mobile machine reserves the machine to that method of control. Once one method of control has established a link to the mobile machine, it is said to be arbitrated. At this time, no other method of control is able to establish a link until the method that currently has a link established, relinquishes control by disconnecting from RCM 180 on-board mobile machine (by breaking or losing its link). For example, if RC operator console 130 establishes a link with a mobile machine, RC operator station 140 would be denied any attempts to connect to that machine. Once the RC operator console is powered down, it is no longer linked. At this time, the RC operator station would be allowed to establish a link.

FIG. 3 illustrates an exemplary flow of method steps that may be performed in transitioning between RC enabled mode 230, RC reserved mode 242, RC active mode 246, and autonomous active mode 248 of operating a mobile machine. At step 302 the RC system 100 may be powered on.

At step 304, the mode of control for the mobile machine may be transitioned to RC enabled mode from a manual mode by an operator flipping a RC/manual switch, or other method, or by a command signal received at the mobile machine from a RC input device. At step 306, a controller such as RCM 180 on-board mobile machine 120 checks to see whether a RC operator console is installed. If a RC operator console is installed (step 306: yes), the controller checks whether a communication link between the mobile machine and the RC operator console is bad. If the link is bad (step 308: yes), the controller then proceeds to step 310. If the link is not bad (step 308: no), the controller proceeds to step 340 to transition the operational mode of the mobile machine to RC reserved mode. At this point the mobile machine is now reserved to the RC operator console.

If the communication link between the mobile machine and the RC operator console is bad (step 308: yes), the controller may now check at step 310 whether it is configured for central site command allocation. If the controller on-board the mobile machine is configured for central site command allocation (step 310: yes), the controller may now transmit a "Machine Available" message to central site command at step 312. If the controller is not configured for central site command allocation (step 310: no), the controller may then attempt to directly load a configured RC operator station IP address at step 316.

At step 314 the controller may check to see whether a valid IP address and/or other identification information for a RC operator station has been obtained, either from central site command, or directly from a configured RC operator station. If a valid IP address for a RC operator station has been obtained (step 314: yes), at step 318 the controller on-board the mobile machine may then transmit a "Machine Available" message to the RC operator station from which a valid IP address has been obtained. If a valid IP address for a RC operator station has not been obtained (step 314: no), the controller may revert back to step 306 to check whether an operator console is installed.

After transmitting the "Machine Available" message to an operator station at step 318, the controller on-board the mobile machine may check to see whether a RC request has been received from the operator station at step 320. If a RC request has been received from the operator station (step 320: yes), at step 322 the controller may transmit a RC request response message back to the operator station, and the control mode for the mobile machine is then set to RC reserved for the operator station at step 340. If a RC request has not been received from the operator station (step 320: no), the controller may revert back to step 306 to check whether an operator console is installed.

After either a RC operator console or a RC operator station has been reserved by the controller at step 340, the controller may check to see whether a communication link has been established with a RC operator station at step 342. If there is no link with an operator station (step 342: no), the controller may then check to see whether there is a good link status with a RC operator console at step 346. If there is a good link with an operator station (step 342: yes), the controller may then check to see whether a RC terminate command has not been received at step 350. If a RC terminate command has not been received from the operator station (step 350: yes), the RC operator station may then pass RC operator station commands to the mobile machine (step 352). At this point the mobile machine transitions to the RC active mode (step: 362), receiving control commands from the linked RC operator station. At the point when the RC operator station is passing commands to the mobile machine (step 352), the mobile machine transitions to the RC active mode (step: 362). At this point a controller such as RCM 180 onboard the mobile machine receives control commands from the linked RC operator station, and passes commands to the various subsystems and ECMs that control operation of the mobile machine. If a RC terminate command has been received from the operator station (step 350: no), the controller on-board the mobile machine may then transition the mode of control back to RC enabled mode at step 304.

When there is no link with an operator station (step 342: no), and there is a good link with a RC operator console (step 346: yes), the RC operator console may then pass commands to the mobile machine (step 348). At this point the mobile machine transitions to the RC active mode (step: 360), receiving control commands from the linked RC operator console. If neither a RC operator station nor a RC operator console has established a good link with the controller on-board the mobile machine (step 346: no and step 350: no), then the operational mode of control for the mobile machine may transition back to the RC enabled mode of step 304. At the point when the RC operator console is passing commands to the mobile machine (step 348), the mobile machine transitions to the RC active mode (step: 360). At this point a controller such as RCM 180 onboard the mobile machine receives control commands from the linked RC operator console, and passes commands to the various subsystems and ECMs that control operation of the mobile machine. When the mobile machine is in RC active mode, either as a result of a good communication link with a RC operator console or with a RC operator station, the operator can decide to transition the machine to autonomous active mode at step 364.

It will be apparent to those skilled in the art that various modifications and variations can be made to the disclosed system and method. Other embodiments will be apparent to those skilled in the art from consideration of the specification and practice of the disclosed system and method. It is intended that the specification and examples be considered as exemplary only, with a true scope being indicated by the following claims.

What is claimed is:

1. A system for controlling a machine, the system comprising:
    a plurality of remote control (RC) devices comprising at least a first RC device and a second RC device, the first RC input device configured to:
        remotely initiate a RC enabled mode on the machine;
        subsequently establish a communication link with the machine when no other RC input device currently has a communication link with the machine;
        transition the machine to a RC reserved mode in which the machine is reserved for control by the RC input device;
        transition a mode of control for the machine to a RC active mode from the RC reserved mode, the RC input device selectively controlling the machine when in the RC active mode; and
        transition the mode of control for the machine to an autonomous mode from the RC active mode;
    a remote control module (RCM) on-board the machine, the RCM being configured to be allocated to only one of the RC input devices at a time when the machine is in the RC enabled mode; and
    a central site command server, the central site command server being configured to allocate the RCM to one RC input device of the plurality of RC input devices at a time by providing identifying information for the one RC input device to the RCM in response to receiving a signal from the RCM.

2. The system of claim 1, wherein the first RC input device is a RC operator console configured to be portable to allow for movement around a work site.

3. The system of claim 1, wherein the first RC input device is a RC operator station configured to include features found inside a cab of a mobile machine including an operator seat and other controls used by an operator to control the machine.

4. The system of claim 1, further including:
a central site command server configured to provide a mission plan for autonomous control of the machine.

5. The system of claim 4, further including a planner electronic control module (ECM) on-board the machine, the planner ECM being configured to determine and specify how the machine will carry out tasks assigned to the machine by the mission plan received from the central site command server.

6. The system of claim 1, further including:
the RCM being configured to receive identifying information directly from one RC input device of the plurality of RC input devices that has been previously configured to control the machine.

7. The system of claim 1, further including:
a remote control module (RCM) on-board the machine, the RCM being configured to:
arbitrate between the plurality of RC input devices attempting to establish communication links with the machine; and
reserve the machine for control by a first RC input device of the plurality of RC input devices to establish a communication link with the machine.

8. A method for controlling a machine; comprising:
transitioning a mode of control for the machine using a processor to a remote control (RC) enabled mode from a manual mode;
establishing a communication link between a first RC input device of a plurality of RC input devices and the machine;
changing the mode of control for the machine, using a processor, from the RC enabled mode to a RC reserved mode in which other RC input devices are no longer permitted to establish a communication link with the machine;
transitioning the mode of control for the machine, using a processor, from the RC reserved mode to a RC active mode in which the machine is being operated by signals received from the first RC input device;
selectively transitioning the mode of control for the machine, using a processor, to an autonomous active mode in which the machine is being operated by signals including signals indicative of an overall mission plan for the machine received from a central site command server; and
allocating a remote control module (RCM) on-board the machine to one RC input device at a time when the mode of control for the machine is the RC enabled mode by:
transmitting a machine available signal to the central site command server, and
providing identifying information for the one RC input device from the central site command server to the RCM.

9. The method of claim 8, further including:
allocating the RCM on-board the machine to the one RC input device by receiving identifying information directly from the one RC input device when the one RC input device has been previously configured to control the machine.

10. The method of claim 8, further including determining and specifying how the machine will carry out tasks assigned to the machine by a mission plan received from the central site command server using a planner electronic control module (ECM) on-board the machine.

11. The method of claim 8, further including:
arbitrating between a plurality of RC input devices attempting to establish communication links with the machine; and
reserving the machine for control by the first RC input device to establish a communication link with the machine.

12. The method of claim 8, further including:
transitioning the mode of control for the machine from the autonomous active mode back to the RC active mode when an operator attempts to initiate a non-overridable command while the machine is still in the autonomous active mode.

13. The method of claim 8, further including:
overriding the autonomous active mode of control of the machine when an operator attempts to initiate an overridable command while the machine is still in the autonomous active mode.

14. The method of claim 8, further including:
transitioning the mode of control for the machine from the autonomous active mode to a RC idle mode when the communication link between the first RC input device and the machine is disconnected.

15. A machine configured to operate in a plurality of modes, the machine comprising:
a remote control (RC) input device;
a controller, the controller configured to:
place the machine in a selected mode of operation based on an input received from the RC input device, the selected mode of operation being one of a manual mode, a RC enabled mode, a RC reserved mode, a RC active mode, and an autonomous active mode; and
transition the machine to the autonomous active mode only from the RC active mode; and
a remote control module (RCM) on-board the machine, the RCM being configured to:
arbitrate between a plurality of RC input devices attempting to establish communication links with the machine; and
reserve the machine for control by a first RC input device to establish a communication link with the machine.

* * * * *